UNITED STATES PATENT OFFICE.

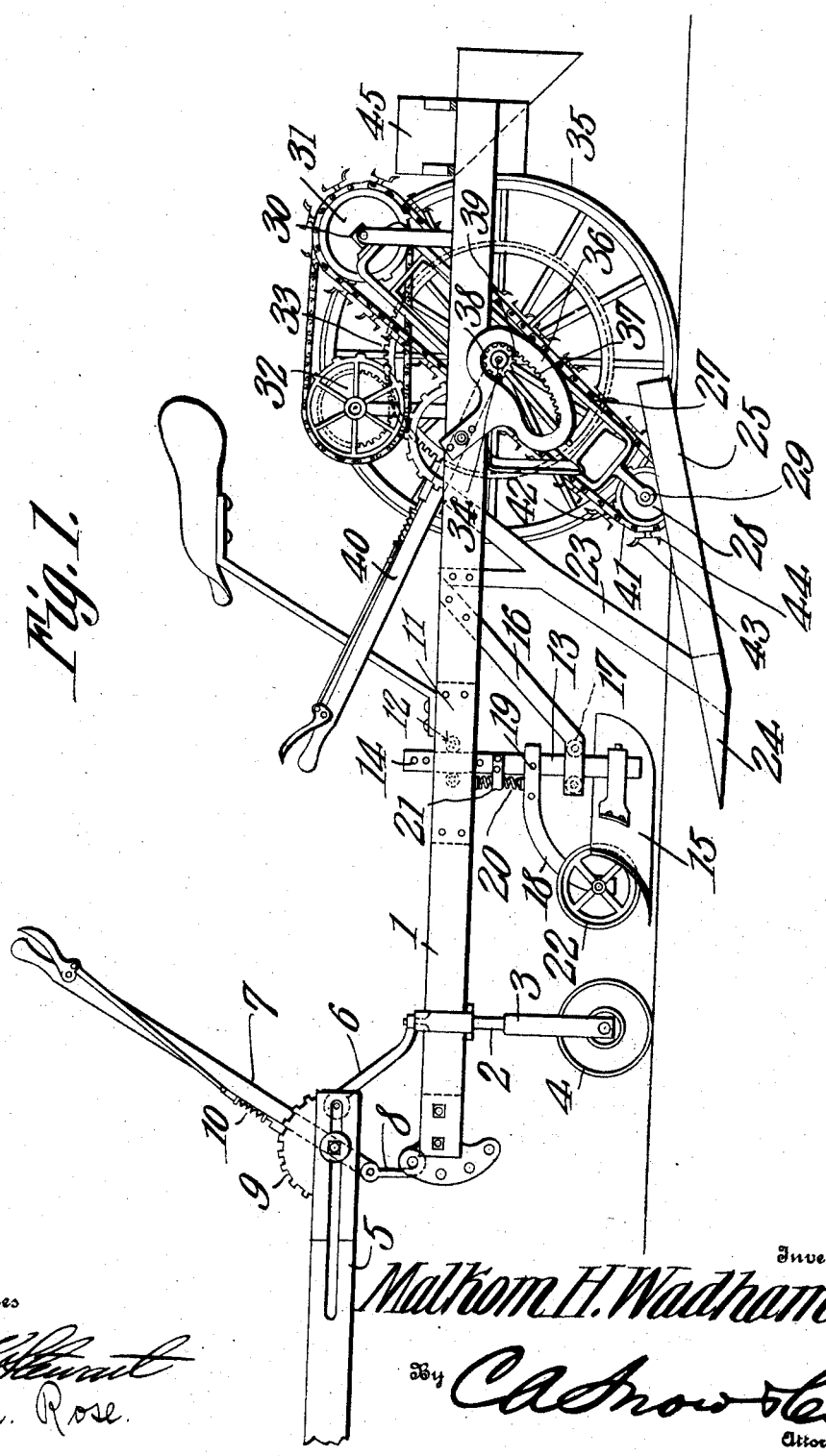

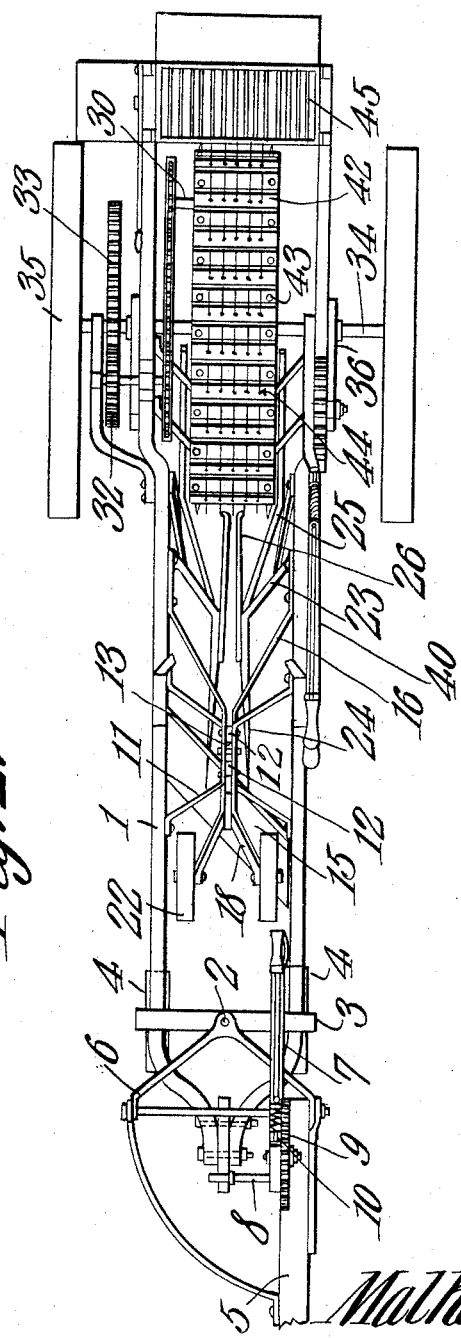

MALKOM H. WADHAMS, OF LAS ANIMAS, COLORADO.

BEET-HARVESTER.

No. 926,837.  Specification of Letters Patent.  Patented July 6, 1909.

Application filed June 30, 1908. Serial No. 441,098.

*To all whom it may concern:*

Be it known that I, MALKOM H. WADHAMS, a citizen of the United States, residing at Las Animas, in the county of Bent and State of Colorado, have invented a new and useful Beet-Harvester, of which the following is a specification.

This invention has relation to a beet harvester and it consists in the novel construction and arrangement of its parts as hereinafter shown and described.

The object of the invention is to provide an implement especially adapted to be used for gathering or harvesting beets, and it consists primarily of a frame mounted at its forward end upon caster wheels which are subjected to tongue control and which is mounted at its rear end portion upon traction wheels.

Means are provided for raising or lowering the forward and rear ends of the frame. A topper or cutter is carried at an intermediate point of the frame and means are provided for causing the said topper or cutter to remove the leaves from the beets above the surface of the ground. A digger is located behind the cutter and is adapted to remove the vegetables from the ground. An elevator and conveyer located behind the digger is adapted to receive the beets from the same and conveys them up and deposits them in a receptacle provided for their reception. The elevator and conveyer is of special construction and forms one of the essential features of the invention and it consists primarily of two endless chains which are adapted to pass around sprocket wheels and which are connected together by cross slats. Beet impaling members are carried by the slats and are adapted to engage the vegetables and elevate them and deposit them in the receptacle provided.

In the accompanying drawings—Figure 1 is a side elevation of the beet harvester. Fig. 2 is a top plan view of the same and, Figs. 3 and 4 are detailed views of the elevator and conveyer.

The implement consists of the frame 1, which is slidably mounted at its forward end upon the shank 2 of the caster bracket 3. The wheels 4 are journaled for rotation at the lower end of the bracket 3. The draft tongue 5 is connected at its rear end with the yoke 6 which in turn is connected to the upper end of the shank 2 of the caster bracket 3. The lever 7 is fulcrumed upon the rear end portion of the tongue 5 and connects with a hook or link 8 which in turn loosely connects with the forward end of the frame 1. The connection between the lever 7 and the link 8 and the frame 1 is sufficiently loose to permit the tongue 5 to swing laterally upon the axis of the shank 2 as a pivot. The gear segment 9 is mounted upon the rear end portion of the tongue 5 and is adapted to be engaged by the pawl 10 carried by the lever 7.

The U-shaped irons 11 are attached to the sides of the frame at points intermediate of the ends thereof. The rollers 12 are freely journaled between the inner opposite portions of the said irons 11. The standard 13 is mounted for movement vertically between the inner portions of the irons 11 and between the rollers 12. The upper portion of the standard 13 is perforated as at 14 and may be held at a desired elevation by means of a pin passed transversely through one of the said perforations 14. The share 15 is carried by the lower end portion of the standard 13 and is disposed with its lower edge substantially horizontal and at approximately an angle of 45 degrees to the line of draft of the implement. The brace 16 depends from the frame 1 and is provided at its lower end portion with the rollers 17 between which the lower end portion of the standard 13 lies. The bracket 18 is pivotally connected at the point 19 to the standard 13 and the spring 20 is interposed between the irons 11 and the said bracket 18 and is under compression with a tendency to hold the said bracket 18 in its lowermost position. The ground wheels 22 are journaled for rotation at the lower end of the bracket 18 and are adapted to travel in front of the share 15 and are adapted to cause the lower edge of the said share 15 to operate upon the plants above the surface of the ground. That is to say, the said share is limited in its downward movement by the pin which is passed through one of the perforations 14 and which engages the irons 11, and the wheels 22 may move vertically against the spring 20, and ride over stones and other obstructions.

The Y-shaped standards 23 depend from the sides of the frame 1 at points intermediate of the ends thereof. The pointed diggers 24 are attached to the lower ends of the standards 23 and merge at their rear portions into the inclined laterally deflected portions 25 which serve as listers or shovels for casting the earth laterally away from the beets as they are being dug. The portions 26 extend rearwardly and upwardly from the rear portions of the diggers 24 in the manner shown in Fig. 2 of the drawing. The conveyer frame 27 is supported upon the frame 1 and the pulleys 28 are mounted upon the shaft 29 which is journaled for rotation at the lower end portion of the said frame 27. The shaft 30 is journaled for rotation at the upper end portion of the conveyer frame 27 and the sprocket wheels 31 are fixed upon the shaft 30 and occupy the same planes as those occupied by the pulleys 28 upon the shaft 29. The gear-wheel 32 is journaled upon the frame 1, and meshes with the gear-wheel 33, which in turn is fixed to the axle 34 upon which the traction wheels 35 are mounted. The links 36 are attached to the sides of the frame 1 and are provided with the internal gear segments 37. The pinions 38 are mounted upon a sleeve 39 which is loosely mounted upon the axle 34 and the said pinions mesh with the gear segments 37. The lever 40 is connected with the sleeve 39 and by manipulating the said lever the said pinion 38 may be turned whereby the rear portion of the frame 1 may be raised or lowered with relation to the axle 34. The chains 41 pass around the sprocket wheels 31 and the pulleys 28 and the said chains 41 are connected together by cross slats 42. The cleaving points 43 are mounted at the ends of the slats 42 and the impaling points 44 are mounted upon the intermediate portions of the slats 42. The said points 44 are resilient in nature and extend at their rear end portions back behind the rear edges of the slats 42 to which they are attached in the manner as shown in Fig. 3 in the drawings. The beet receptacle 45 is located upon the rear end of the frame 1 immediately behind the upper end of the conveyer frame 27.

The operation of the implement is as follows:—As the implement is drawn along a row of beets, the share 15 engages the tops of the beets and cleaves the tops from the roots and throws the material thus removed from the roots to one side. As above explained the ground wheels 22 assure that the share 15 will operate at an approximately uniform distance above the surface of the ground. As the roots come into contact with the diggers 24 they are elevated and eventually pass in between the rods 26. As the machine advances the beets pass along the rods 26 and are impaled upon the points 44. By reason of the fact that the chains 41 are passed around the sprocket wheels 31 and the pulleys 28 and the shaft 30 through the intermeshing gear-wheels 32 and 33 is caused to rotate with the axle 34, the said chains 41 move in an orbit and the beets which are impaled upon the points 44 are carried up and over the sprocket wheels 31. As the said points begin to descend in the under portion of the orbit, the beets are brought in contact with the edge of the receptacle 45 and are scraped from the points 44 and fall into the said receptacle.

It will be observed that the wheels 31 are greater in diameter than the pulley wheel 28, and, consequently, as the chains 41 move around the wheels 28, they change the course of direction in which they move quicker than they do while passing around the sprocket wheels 31. This difference in the movement of the chains at the ends of the orbits facilitates the handling of the roots for the reason that the points 44 are given a whipping movement at the time that the roots are impaled upon the same. Thus the roots are firmly seated upon the said points. Then, on the other hand, when the points carried by the chain are passing around the wheel 31, they are changing their course of direction more gradually, and the roots are scraped from the impaling pins or points by the edge of the receptacle 45 without danger of injuring the texture of the roots. The resiliency of the points 44 further protects the roots from mutilation.

Having described my invention what I claim as new and desire to secure by Letters Patent is:—

1. In an implement as described, a main frame, a share attached thereto, diggers carried by the frame, an elevator consisting of a frame attached to the main frame, movable chain belts mounted upon the elevator frame, cross slats connecting the chain belts together, cleaving points mounted upon the end portions of the slats and resilient points attached to the intermediate portions of the slats and projecting laterally beyond the edges of the slats and terminating in pointed outstanding extremities.

2. A beet harvester comprising a main frame, a share attached thereto, diggers carried by the frame, an elevator consisting of the frame attached to the main frame, relatively large sprocket wheels journaled at the upper portion of the elevator frame, relatively small sprocket wheels journaled for rotation at the lower portion of the elevator frame, endless chain belts passing around the said sprocket wheels, cross-slats connecting the chain belts together, cleaving points mounted upon the end portions of the slats, and resilient points attached to the intermediate portions of the slats and projecting laterally beyond the edges of the slats and terminating in pointed outstanding extremities.

In testimony that I claim the foregoing as my own, I have hereto affixed my signature in the presence of two witnesses.

MALKOM H. WADHAMS.

Witnesses:
EINAR J. WALLINGER,
JOHN F. WADHAMS.